United States Patent [19]
Ahmling

[11] 3,779,571
[45] Dec. 18, 1973

[54] SKID PALLET

[76] Inventor: Magnus P. Ahmling, Rt. No. 1, Brighton, Iowa 52540

[22] Filed: May 11, 1972

[21] Appl. No.: 252,299

[52] U.S. Cl. .................................. 280/19, 280/24
[51] Int. Cl. ............................................ B62b 15/00
[58] Field of Search ................ 280/19, 24, 25, 475; 193/46, 41

[56] References Cited
UNITED STATES PATENTS
1,047,141  12/1912  Arnold .................................. 280/24
3,419,169  12/1968  James .................................. 280/475

Primary Examiner—Robert R. Song
Attorney—Zarley, McKee & Thomte

[57] ABSTRACT

A skid pallet comprises a frame having skid runners thereon, a tongue pivotally connected to the frame for pivotal movement about a horizontal axis, and a pressure bracket connected to the tongue at a point spaced from the horizontal axis. The pressure bracket extends downwardly from the tongue a sufficient distance to protrude below the skid runners when the tongue moves from an elevated position toward a lowered position so that the pressure bracket will engage the ground and provide a leverage fulcrum for lifting the runners in response to lowering of the tongue about the horizontal axis.

8 Claims, 6 Drawing Figures

PATENTED DEC 18 1973 3,779,571
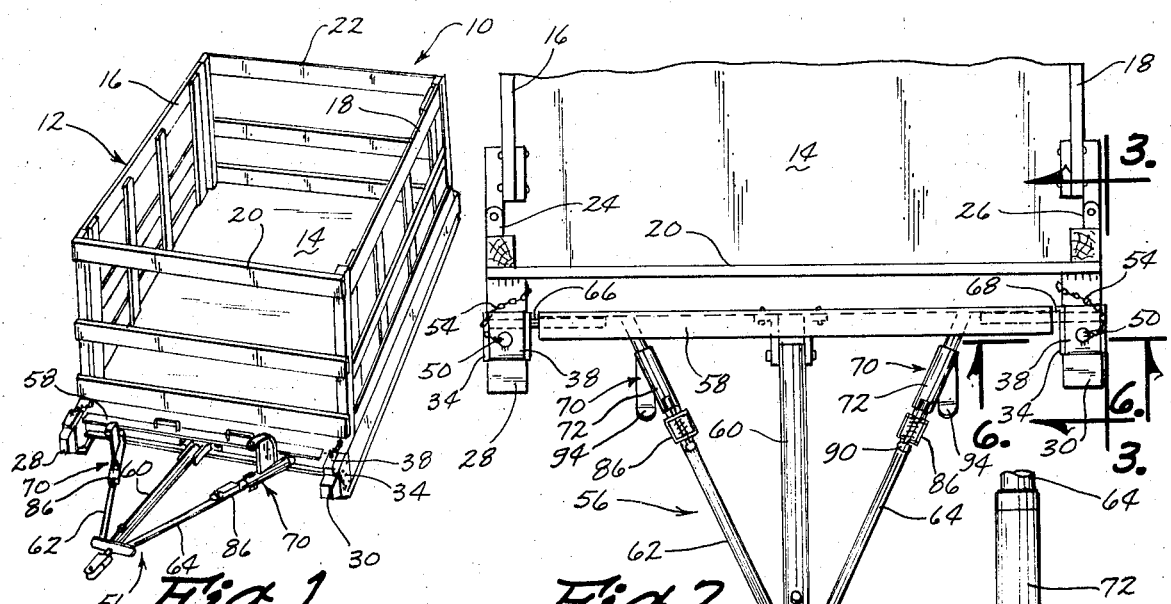
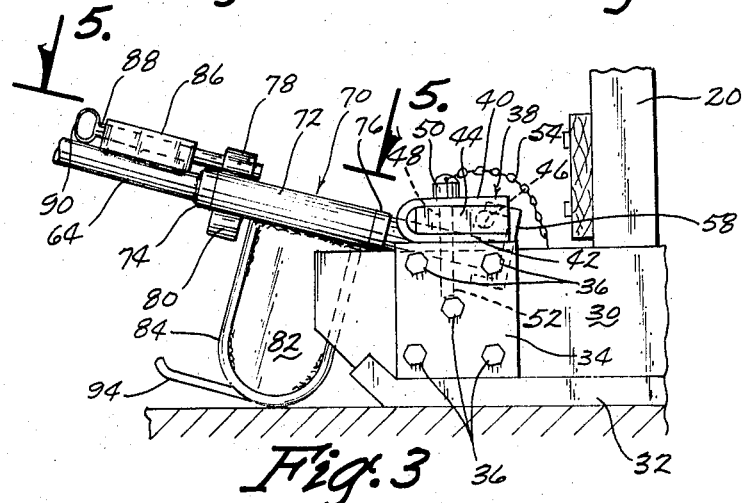
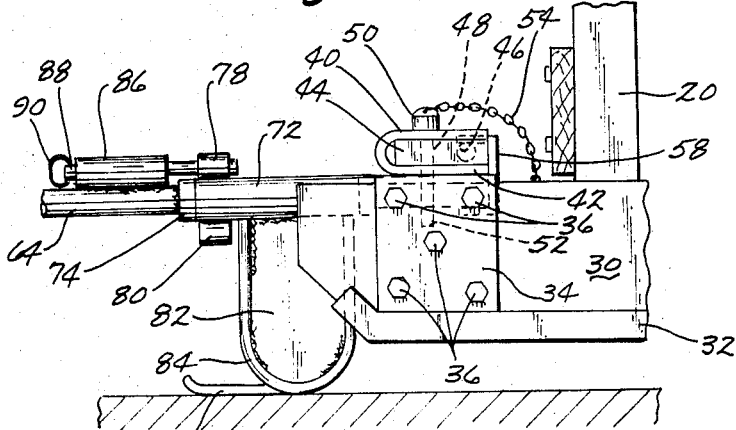
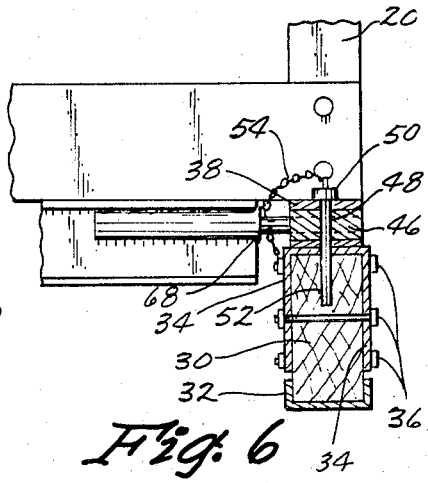

SKID PALLET

The present invention relates generally to skid pallets and particularly to skid pallets having means thereon for freeing the skid pallet from the ground and facilitating sliding movement of the skid pallet on the ground.

Many industries utilize pallets upon which goods may be stored. and which can be slidably moved along the ground or other supporting surface from one point to another. Such sleds or pallets are commonly used, for example, in the agricultural business to transport silage, feed and other materials to various points on the farm.

One problem which commonly occurs with such devices is that the runners of the devices become frozen or otherwise stuck to the ground. Even if a tractor or other vehicle is used to free the device from the ground, such methods often result in breaking the pallet or the runners of the pallet.

Therefore, a primary object of the present invention is the provision of a skid pallet having means thereon for freeing it from static frictional resistance with respect to the ground.

A further object of the present invention is the provision of a skid pallet having means for freeing it from the ground when it becomes frozen or otherwise stuck to the ground.

A further object of the present invention is the provision of a skid pallet having a tongue which is easily removeable.

A further object of the present invention is the provision of a skid pallet which permits the use of leverage to free it from frictional engagement with the ground.

A further object of the present invention is the provision of a skid pallet which may be freed from the ground without breaking any portions thereof.

A further object of the present invention is the provision of a skid pallet which is econimical to manufacture, efficient, and durable in use.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the skid pallet of the present invention.

FIG. 2 is a top view of the forward portion of the skid pallet of the present invention.

FIG. 3 is a sectional view taken along line 3 — 3 of FIG. 2.

FIG. 4 is a view similar to FIG. 3 showing the pressure bracket in a lowered position.

FIG. 5 is a sectional view taken along line 5 — 5 of FIG. 3

FIG. 6 is a sectional view taken along line 6 — 6 of FIG. 2.

Referring to the drawings, a pallet 10 includes a frame 12 having a floor 14 opposite vertical sides 16 and 18, a forward end wall 20 and a rearward end wall 22. While it is not critical to the invention, vertical sides 16 and 18 may be hinged by means of hinges 24, 26 (FIG. 2) so as to permit access for placing items on floor 14.

Underneath floor 14 are two parallel runners 28, 30 which may be made of wood or other suitable material. It is preferable, however, to have metal strips such as strips 32 on the lower edges of runners 28, 30 so as to reduce the friction between runners 28, 30 and the ground.

Each of the forward ends of runners 28, 30 is surrounded by a metal U-shaped sheath 34 which is inverted so that its opposite sides extend downwardly and embrace the lateral sides of runner 30. Extending through runner 30 and the lateral sides of U-shaped sheaths 34 are a plurality of bolts 36. Welded to the upper surface of sheath 34 is a U-shaped bracket 38 which includes an upper member 40 and a lower member 42 and which has its open end rearwardly disposed.

Detachably mounted between upper and lower members 40, 42 of bracket 38 is a pillow block 44. Pillow block 44 includes a horizontal bore 46 (FIGS. 3, 4 and 6) and includes a vertical eye 48 extending therethrough. Upper and lower members 40, 42 are provided with eyes which are aligned with eye 48. A locking pin 50 is slidably inserted through the eyes in bracket 38 and through eye 48 so as to secure pillow block 44 within bracket 38. Runners 28, 30 may be provided with vertical bores 52 which are in alignment with eyes 48 so as to permit pins 50 to extend downwardly within runners 28, 30. A chain 54 secures pin 50 to runner 30 so that it will not be lost when it is removed from pillow block 38.

A tongue 56 includes a cross bar 58, a T-member 60 perpendicular to cross bar 58, and two diagonal strut members 62, 64 which reinforce T-member 60. Members 58, 60, 62 and 64 are rigid with respect to one another. Extending from the opposite ends of cross member 58 are a pair of pivot pins 66, 68 which are welded to cross bar 58. Pivot pins 66, 68 are rotatably journaled in horizontal bores 46 of pillow blocks 38 so as to provide a pivotal mounting for tongue 56 about a horizontal axis which is parallel to the longitudinal axis of cross bar 58.

A pressure bracket 70 is shown mounted on strut members 64, but pressure bracket 70 may be mounted upon any of members 60, 62 or 64 without detracting from the invention. Bracket 70 includes a sleeve 72 which is slidably mounted on strut member 64 for rotational sliding movement thereon. Longitudinal sliding movement of sleeve 72 is prevented by means of stops 74, 76 (FIGS. 3 and 4) which are welded on strut member 64. Welded to sleeve 72 are a pair of locking eyelets 78, 80 having an inverted U-shape. Also welded to sleeve 72 and protruding radially outwardly therefrom is a somewhat elongated fulcrum plate 82. Plate 82 has a rounded lower end 84 which facilitates its pivotal action against a supporting surface.

Welded to the lower end of plate 82 is a shoe or runner 94. Shoe 94 has a smooth flat surface and is adapted to be approximately horizontally disposed when tongue 56 is horizontal as shown in FIG. 4. Furthermore, the longitudinal axis of shoe 94 is in alignment with the longitudinal axes of runners 28,30. While the present invention will operate satisfactorily without shoe 94, the flat surface of shoe 94 is helpful in preventing the sinking of plate 82 into mud or soft soil.

Rigidly mounted to strut member 64 is a locking bolt bracket 86, and slidably mounted within bracket 86 is a locking bolt 88 having a handle 90 on one end thereof. A spring 92 (FIG. 5) yieldably holds bolt 90 in a position wherein one of its ends protrudes within one of locking eyelets 78, 80 of pressure bracket 70.

In operation pressure bracket 70 may be locked in either an inoperative position as shown in FIG. 1 or in operative position as shown in FIGS. 3 and 4. Movement of pressure bracket 70 from its operative to its inoperative position is accomplished by withdrawing locking bolt 8 from eyelet 80, and pivoting fulcrum plate 82 to its downward position as shown in FIG. 3. Locking bolt 88 is then inserted into eyelet 78 so as to lock pressure bracket 70 in its operative position. The reverse of the above described method is utilized for moving pressure bracket 70 from its operative position to its inoperative position, and locking bolt 88 is inserted in eyelet 80 in this position.

When pallet 10 has been supporting a heavy load outdoors, it is very common for runners 28, 30 to become frozen or otherwise mired in the ground. When this happens, pressure bracket 70 is moved to its operative position, and tongue 56 is depressed from the position shown in FIG. 3 to the position shown in FIG. 4. The rounded lower end 84 of fulcrum plate 82 serves as a fulcrum, and the leverage exerted by tongue 56 about this fulcrum causes runners 30 to be lifted off the supporting surface. It will be noted that fulcrum plate 82 is sufficiently long to protrude downwardly below the lowermost portion of runners 28, 30 when tongue 56 is in its depressed position. Sheath 34, because of its surrounding relationship to runners 30, provides reinforcement thereto so as to prevent breaking of any portion of pallet 10 during the time that is being pried loose from the ground.

Tongue 56 may be removed from pallet 10 by removing pins 50 and sliding pillow blocks 46 out of U-shaped brackets The upper The members 40 of U-shaped brackets 38, however, insure that cross bar 58 is tightly secured to runners 28, 30 when upward leverage is being applied to runners 28, 30. Thus, tongue 56 may be quickly and easily removed from pallet 10 so as to be used for other pallets. It can be seen that only one tongue would be necessary for use with a plurality of pallets.

Thus it can be seen that the device accomplishes at least all of its stated objectives.

I claim:
1. A skid pallet comprising,
a frame having skid runners thereof for sliding supporting engagement with the ground;
a tongue pivotally connected to said frame for pivotal movement about a horizontal axis from an elevated to a lowered position,
said tongue having a strut member rigidly connected thereto;
a pressure bracket movably mounted on said strut member of said tongue, at a point spaced from said horizontal axis by a sleeve surrounding said strut member for movement from an operative position wherein said pressure bracket protrudes downwardly from said tongue to an inoperative position free from engagement with the ground; and
said pressure bracket extending downwardly from said tongue a sufficient distance to protrude below said skid runners when said tongue moves from said inoperative position towards said operative position whereby said pressure bracket will engage the ground and provide a leverage fulcrum for lifting said runners in response to lowering of said tongue about its said horizontal axis.

2. A skid pallet according to claim 1 wherein a lock means is mounted on said strut member for selectively engaging and locking said pressure bracket in said operative and said inoperative positions.

3. A skid pallet according to claim 2 wherein said tongue is detachably secured to said frame.

4. A skid pallet according to claim 3 wherein said tongue includes an elongated cross bar having a longitudinal axis parallel to said horizontal axis: a pair of pillow blocks being mounted on said frame; said cross bar having its opposite ends rotatably journaled in said pillow blocks.

5. A skid pallet according to claim 4 wherein said strut member having one end connected to said cross bar; said pressure bracket being mounted on said elongated member.

6. A skid pallet according to claim 5 wherein said lock means includes two locking elements adapted to interlock, one of said locking elements being on said strut member and the other of said locking elements being on said sleeve.

7. A skid pallet according to claim 4 wherein said pillow blocks are removable from said frame and said cross bar so as to permit removal of said cross bar from said frame.

8. A skid pallet according to claim 7 wherein said pillow blocks include eyes and said frame includes eyes aligned with said eyes of said pillow blocks, pins being slidably inserted through said eyes of said frame and said pillow blocks to secure said pillow blocks to said frame.

* * * * *